US009213974B2

(12) United States Patent
Votaw et al.

(10) Patent No.: US 9,213,974 B2
(45) Date of Patent: Dec. 15, 2015

(54) REMOTE REVOCATION OF APPLICATION ACCESS BASED ON NON-CO-LOCATION OF A TRANSACTION VEHICLE AND A MOBILE DEVICE

(71) Applicant: BANK OF AMERICA CORPORATION, Charlotte, NC (US)

(72) Inventors: Elizabeth S. Votaw, Potomac, MD (US); Charles Jason Burrell, Middleburg, FL (US); Carrie Anne Hanson, Charlotte, NC (US); Alicia C. Jones, Fort Mill, SC (US); Michael Patrick Lynch, Jacksonville, FL (US); Hood Qaim-Maqami, Montclair, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/175,786

(22) Filed: Feb. 7, 2014

(65) Prior Publication Data

US 2015/0227927 A1 Aug. 13, 2015

(51) Int. Cl.
*G06Q 20/40* (2012.01)
*G06Q 20/32* (2012.01)
*G06Q 20/34* (2012.01)

(52) U.S. Cl.
CPC .............. *G06Q 20/40* (2013.01); *G06Q 20/322* (2013.01); *G06Q 20/351* (2013.01)

(58) Field of Classification Search
None
See application file for complete search history.

(56) References Cited

U.S. PATENT DOCUMENTS

| 5,437,346 | A  | 8/1995 | Dumont |
| 6,256,670 | B1 | 7/2001 | Davies |
| 7,111,323 | B1 | 9/2006 | Bhatia et al. |
| 7,231,202 | B2 | 6/2007 | Natsuno |
| 7,239,226 | B2 | 7/2007 | Berardi et al. |

(Continued)

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

(Continued)

*Primary Examiner* — Kimberly Berona
*Assistant Examiner* — Joseph King
(74) *Attorney, Agent, or Firm* — Michael A. Springs; Moore & Van Allen PLLC; Nicholas C. Russell

(57) ABSTRACT

Embodiments of the invention relate to an invention for accessing a remotely located mobile device of a user based on certain events. The system, method, and computer program product are configured to: (a) monitor one or more transaction involving a transaction vehicle of a user; (b) determine a physical location of a transaction vehicle based at least partially on the one or more transactions; (c) determine a geographic location of a mobile device of the user, wherein the mobile device is associated with the transaction vehicle; (d) determine whether or not the transaction vehicle of the user and the mobile device of the user are co-located; and (e) reconfigure one or more applications accessible to the mobile device or one or more functional features of the mobile device based at least partially on determining that the mobile device and the transaction vehicle of the user are not co-located.

19 Claims, 5 Drawing Sheets

(56) References Cited

U.S. PATENT DOCUMENTS

| | | | |
|---|---|---|---|
| 7,373,515 B2 | 5/2008 | Owen et al. | |
| 7,472,081 B1 | 12/2008 | Cason | |
| 7,529,741 B2 | 5/2009 | Aravamudan et al. | |
| 7,546,276 B2 | 6/2009 | Randle et al. | |
| 7,697,920 B1 | 4/2010 | McClain | |
| 7,783,281 B1 | 8/2010 | Cook et al. | |
| 7,930,264 B2 | 4/2011 | Geppert | |
| 7,988,045 B2 | 8/2011 | Connell, II et al. | |
| 8,012,219 B2 | 9/2011 | Mendez et al. | |
| 8,156,335 B2 | 4/2012 | Lin | |
| 8,165,945 B2 | 4/2012 | Collins et al. | |
| 8,201,232 B2 | 6/2012 | Zhang et al. | |
| 8,214,650 B2 | 7/2012 | Dickinson et al. | |
| 8,244,210 B2 | 8/2012 | Ayanamcottil et al. | |
| 8,261,093 B1 | 9/2012 | Dhesi et al. | |
| 8,270,995 B1 | 9/2012 | Manroa et al. | |
| 8,286,227 B1 | 10/2012 | Zheng | |
| 8,295,812 B1 | 10/2012 | Jones | |
| 8,295,898 B2 | 10/2012 | Ashfield et al. | |
| 8,307,412 B2 | 11/2012 | Ozzie et al. | |
| 8,332,272 B2 | 12/2012 | Fisher | |
| 8,352,323 B2 | 1/2013 | Fisher | |
| 8,352,730 B2 | 1/2013 | Giobbi | |
| 8,369,833 B2 | 2/2013 | McClain | |
| 8,380,177 B2 | 2/2013 | Laracey | |
| 8,412,626 B2 | 4/2013 | Hirson et al. | |
| 8,423,466 B2 | 4/2013 | Lanc | |
| 8,442,915 B2 | 5/2013 | Takatori et al. | |
| 8,483,663 B1 | 7/2013 | Jones | |
| 8,485,438 B2 | 7/2013 | Dollard | |
| 8,601,602 B1 | 12/2013 | Zheng | |
| 8,644,506 B2 | 2/2014 | Zellner | |
| 8,660,358 B1 | 2/2014 | Bergboer et al. | |
| 8,683,571 B2 | 3/2014 | Zapata et al. | |
| 8,744,968 B1 | 6/2014 | Grigg et al. | |
| 8,768,838 B1 | 7/2014 | Hoffman | |
| 8,769,270 B2 | 7/2014 | Orsini et al. | |
| 8,869,241 B2 | 10/2014 | Davis et al. | |
| 8,869,305 B1 | 10/2014 | Huang | |
| 8,881,306 B2 | 11/2014 | Feldman et al. | |
| 8,930,271 B1* | 1/2015 | Ellis et al. | 705/41 |
| 8,973,102 B2 | 3/2015 | Jakobsson | |
| 2002/0077978 A1 | 6/2002 | O'Leary et al. | |
| 2002/0157029 A1 | 10/2002 | French et al. | |
| 2002/0174073 A1 | 11/2002 | Nordman et al. | |
| 2003/0065805 A1 | 4/2003 | Barnes, Jr. | |
| 2006/0030333 A1 | 2/2006 | Ward et al. | |
| 2007/0094152 A1 | 4/2007 | Bauman et al. | |
| 2007/0100773 A1 | 5/2007 | Wallach | |
| 2007/0156842 A1 | 7/2007 | Vermeulen et al. | |
| 2007/0168677 A1 | 7/2007 | Kudo et al. | |
| 2007/0219984 A1 | 9/2007 | Aravamudan et al. | |
| 2007/0250920 A1 | 10/2007 | Lindsay | |
| 2008/0293397 A1 | 11/2008 | Gajdos et al. | |
| 2009/0019534 A1 | 1/2009 | Bakshi et al. | |
| 2009/0100529 A1 | 4/2009 | Livnat et al. | |
| 2009/0150286 A1 | 6/2009 | Barton | |
| 2009/0187492 A1 | 7/2009 | Hammad et al. | |
| 2009/0199264 A1 | 8/2009 | Lang | |
| 2009/0217346 A1 | 8/2009 | Manring et al. | |
| 2009/0254975 A1 | 10/2009 | Turnbull et al. | |
| 2010/0100897 A1 | 4/2010 | Manuel-Devadoss | |
| 2010/0122333 A1 | 5/2010 | Noe | |
| 2010/0330958 A1 | 12/2010 | Corda et al. | |
| 2011/0016534 A1 | 1/2011 | Jakobsson et al. | |
| 2011/0137804 A1* | 6/2011 | Peterson | 705/77 |
| 2011/0142234 A1 | 6/2011 | Rogers | |
| 2011/0159846 A1 | 6/2011 | Kemshall | |
| 2011/0167440 A1 | 7/2011 | Greenfield | |
| 2011/0208601 A1 | 8/2011 | Ferguson et al. | |
| 2011/0270618 A1 | 11/2011 | Banerjee et al. | |
| 2011/0320296 A1 | 12/2011 | Edwards | |
| 2012/0054057 A1 | 3/2012 | O'Connell et al. | |
| 2012/0089514 A1 | 4/2012 | Kraemling et al. | |
| 2012/0095916 A1 | 4/2012 | Dorsey et al. | |
| 2012/0137340 A1 | 5/2012 | Jakobsson et al. | |
| 2012/0144468 A1 | 6/2012 | Pratt et al. | |
| 2012/0160912 A1 | 6/2012 | Laracey | |
| 2012/0173551 A1 | 7/2012 | Haddorp et al. | |
| 2012/0174237 A1 | 7/2012 | Krzyzanowski | |
| 2012/0197743 A1* | 8/2012 | Grigg et al. | 705/16 |
| 2012/0230539 A1 | 9/2012 | Calman et al. | |
| 2012/0239576 A1 | 9/2012 | Rose et al. | |
| 2012/0254941 A1 | 10/2012 | Levien et al. | |
| 2012/0254943 A1 | 10/2012 | Li | |
| 2012/0265585 A1 | 10/2012 | Muirbrook et al. | |
| 2012/0300938 A1 | 11/2012 | Kean et al. | |
| 2012/0316963 A1 | 12/2012 | Moshfeghi | |
| 2013/0007874 A1 | 1/2013 | Purvis | |
| 2013/0013498 A1 | 1/2013 | Fisher et al. | |
| 2013/0030882 A1 | 1/2013 | Davis, III et al. | |
| 2013/0030931 A1 | 1/2013 | Moshfeghi | |
| 2013/0031003 A1 | 1/2013 | Dorsey et al. | |
| 2013/0031004 A1 | 1/2013 | Dorsey et al. | |
| 2013/0042314 A1 | 2/2013 | Kelley | |
| 2013/0097682 A1 | 4/2013 | Zeljkovic et al. | |
| 2013/0097683 A1 | 4/2013 | Davis et al. | |
| 2013/0097684 A1 | 4/2013 | Kim | |
| 2013/0102283 A1 | 4/2013 | Lau et al. | |
| 2013/0111208 A1 | 5/2013 | Sabin et al. | |
| 2013/0143621 A1 | 6/2013 | Kumaran | |
| 2013/0167207 A1 | 6/2013 | Davis et al. | |
| 2013/0173456 A1 | 7/2013 | Grigg et al. | |
| 2013/0178233 A1 | 7/2013 | McCoy et al. | |
| 2013/0188485 A1 | 7/2013 | Midani et al. | |
| 2013/0198056 A1 | 8/2013 | Aldrey et al. | |
| 2013/0219454 A1 | 8/2013 | Hewinson | |
| 2013/0267204 A1 | 10/2013 | Schultz et al. | |
| 2013/0290361 A1 | 10/2013 | Anderson et al. | |
| 2014/0130127 A1 | 5/2014 | Toole et al. | |
| 2014/0173704 A1 | 6/2014 | Adams et al. | |
| 2014/0208401 A1 | 7/2014 | Balakrishnan et al. | |
| 2014/0279270 A1 | 9/2014 | Bertanzetti et al. | |
| 2014/0289821 A1 | 9/2014 | Wilson | |
| 2014/0310764 A1 | 10/2014 | Tippett et al. | |
| 2014/0315159 A1 | 10/2014 | Mukherjee et al. | |
| 2015/0032621 A1 | 1/2015 | Kar et al. | |
| 2015/0120572 A1* | 4/2015 | Slade | 705/73 |
| 2015/0213474 A1 | 7/2015 | Howe | |

OTHER PUBLICATIONS

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

QThru.com. "QThru: use your mobile smartphone for self-checkout." http://www.qthru.com/. QThru.com © 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

Office Action dated Aug. 27, 2015 for U.S. Appl. No. 14/175,701.

\* cited by examiner

REMOTE REVOCATION OF APPLICATION ACCESS BASED ON NON-CO-LOCATION OF A TRANSACTION VEHICLE AND A MOBILE DEVICE

BACKGROUND

In general, banking customers now have access to their banking and credit accounts via various mobile devices, such as their smart phones, tablets, and the like. Customers using their mobile devices are now able to download mobile banking applications and a variety of other mobile financial applications, which allow the customer to manage their financial accounts and even conduct various transaction directly through the mobile applications. In many instances, customers can manage their bank cards using some of these mobile applications. However, currently, there does not appear to be any meaningful protections for customers whose mobile devices and/or bank cards are compromised. As such, there exists a need for an invention that provides additional protections to customers when their mobile devices and/or bank cards are compromised.

BRIEF SUMMARY OF REMOTE REVOCATION OF APPLICATION ACCESS BASED ON LOST OR MISAPPROPRIATED CARD

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

An invention for accessing a remotely located mobile device of a user based on certain events is provided. In some embodiments, the invention includes a computer apparatus including a processor and a memory; and a software module stored in the memory, comprising executable instructions that when executed causes the processor to: (a) receive an indication that a transaction vehicle of the user is compromised; (b) identify a mobile device of the user that is associated with the transaction vehicle of the user that is compromised; (c) upon identifying the mobile device of the user, remotely access the mobile device of the user; and (d) reconfigure one or more applications accessible to the mobile device or one or more functional features of the mobile device based at least partially on receiving the indication.

In some embodiments, the invention is configured to provide a notification to the user indicating that one or more applications to the mobile device or one or more functional features of the mobile device are reconfigured.

In some embodiments, the transaction vehicle comprises a bank card, a debit card, a credit card, a loyalty card, a resource access card, a virtual transaction card, or a combination any of the fore-mentioned card types.

In some embodiments, the indication that the transaction vehicle of the user is compromised comprises receiving an indication that the transaction vehicle is misplaced or receiving an indication that the transaction vehicle is misappropriated.

In some embodiments, the indication that the transaction vehicle of the user is compromised is provided by the user and is received by a financial institution of the user. In some embodiments, when the indication that the transaction vehicle of the user is compromised comprises receiving an indication that the transaction vehicle is misappropriated, automatically triggers the processor to: terminate or suspend, in substantially real-time, an account associated with the transaction vehicle; and submit a request issuing a replacement transaction vehicle to the user.

In some embodiments, reconfiguring the one or more applications accessible to the mobile device comprises disabling access to one or more financial applications including a mobile banking application associated with a financial institution of the user.

BRIEF SUMMARY OF REMOTE REVOCATION OF APPLICATION ACCESS BASED ON NON-CO-LOCATED CARD

An invention for accessing a remotely located mobile device of a user based on non-co-location of the mobile device and a transaction vehicle of the user is provided. In some embodiments, the invention includes a computer apparatus including a processor and a memory; and a software module stored in the memory, comprising executable instructions that when executed causes the processor to: (a) monitor one or more transaction involving a transaction vehicle of a user; (b) determine a physical location of a transaction vehicle based at least partially on the one or more transactions; (c) determine a geographic location of a mobile device of the user, wherein the mobile device is associated with the transaction vehicle; (d) determine whether or not the transaction vehicle of the user and the mobile device of the user are co-located; and (e) reconfigure one or more applications accessible to the mobile device or one or more functional features of the mobile device based at least partially on determining that the mobile device and the transaction vehicle of the user are not co-located.

In some embodiments, the invention is configured to provide a notification to the user indicating that one or more applications to the mobile device or one or more functional features of the mobile device are reconfigured.

In some embodiments, the transaction vehicle comprises a bank card, a debit card, a credit card, a loyalty card, a resource access card, a virtual transaction card, or a combination any of the fore-mentioned card types.

In some embodiments, provides a prompt, to the mobile device, requiring full authentication of the user prior to restoring the mobile device to an original state prior to the reconfiguration.

In some embodiments, the mobile device of the user and the transaction vehicle of the user are co-located when the mobile device and the transaction vehicle are within a predefined distance of each other.

In some embodiments, the mobile device of the user and the transaction vehicle of the user are co-located when it is determined that the mobile device and the transaction vehicle are within a predefined distance of each other upon a completion of a most recent transaction involving the transaction vehicle.

In some embodiments, reconfiguring the one or more applications accessible to the mobile device comprises disabling access to one or more financial applications including a mobile banking application associated with a financial institution of the user.

BRIEF DESCRIPTION OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION OF EMBODIMENTS OF THE INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, and/or operational aspects of any of the embodiments of the present invention described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Revocation of Application Access Based on Lost or Misappropriated Card

In general terms, embodiments of the present invention relate to methods, systems, and computer program products for remotely revoking user access to one or more applications on a mobile device when it is determined that a transaction card of a user has been compromised or has been misplaced. For example, some embodiments of the present invention are configured to identify or determine that a customer of a financial institution has misplaced his transaction card or that the transaction card of the customer is compromised. As another example, some embodiments of the present invention are additionally configured to identify a mobile device associated with the misplaced or compromised transaction card. As yet another example, some embodiments of the present invention are configured to identify mobile applications, such as a mobile banking application, stored on or accessible to the mobile device. As a further example, some embodiments are configured to remotely access the identified mobile device. As still another example, some embodiments of the present invention are configured to revoke user access to the one or more mobile applications accessible via the mobile device. As another example, some embodiments of the present invention are configured to provide a notification to the customer indicating that user access to one or more mobile applications accessible to the mobile device has been revoked by the financial institution.

Figure 1:
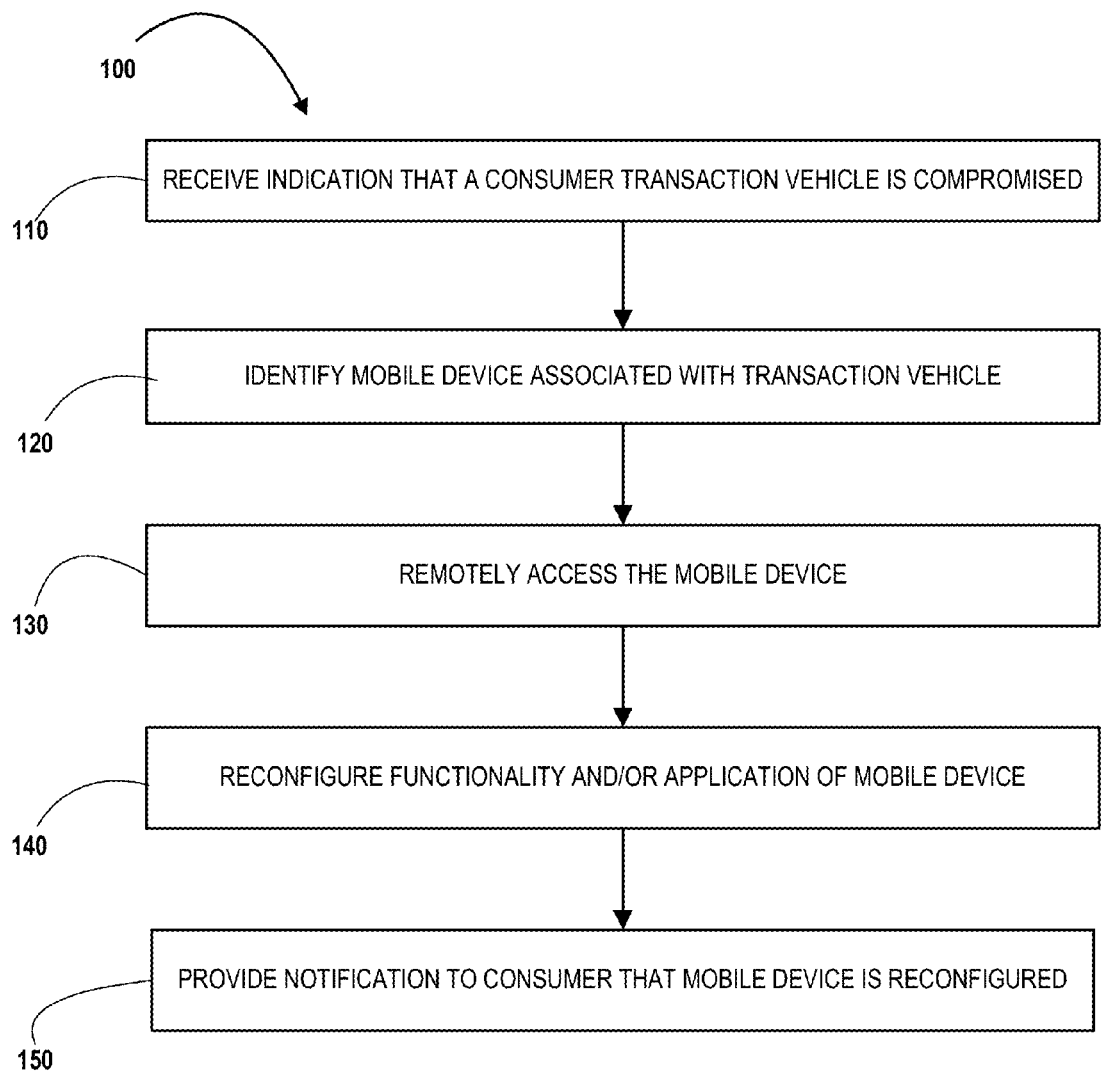
FIG. 1 is a flowchart illustrating a system and method for remotely revoking access to applications on a mobile device of a customer based at least partially on determining that a transaction card of the customer is compromised or lost.

Referring now to FIG. 1, a general process flow 100 of a system for remotely revoking access to applications on a mobile device of a customer based at least partially on determining that a transaction card of the customer is compromised or lost. As represented by block 110, the system is configured to receive an indication that a transaction card of a customer is compromised or misplaced. As represented by the block 120, the system is configured to determine one or more mobile devices associated with the transaction card of the customer. As represented by block 130, the system is configured to locate the geographic position of the one or more mobile devices. Further, as represented by block 130, the system is configured to remotely access the one or more mobile devices. As then represented by block 140, the system is also configured to remotely disable or revoke user access, temporarily or permanently, to any functionality of the mobile device or application stored on or accessible to the mobile device. Lastly, as represented by block 150, the system is configured to provide a notification to the customer indicating that access to one or more applications accessible to the mobile device are disabled and a process for reinstating user access to the one or more applications.

Accordingly, the system having the process flow 100 enables a financial institution or issuer of a transaction card to customers to remotely access one or more mobile devices for modifying its functionality in light of certain events, such as, a reported compromised or lost card. As such, the issuer of the transaction card can engage the mobile device of a customer to remotely disable access to applications, such as online banking, or other functionality, as required for the protection of the customer. In this way, although the mobile device is not accessible or retrievable by the customer, this invention prevents any authorized use of the applications and/or functionality of the mobile device.

Regarding the block 110, the term "transaction card," as used herein, refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the transaction card is a credit card issued by a bank which a customer may use to perform purchase transactions. However, in other embodiments, the transaction card is a virtual debit card housed in a mobile device of the customer, which can be used to electronically interact with an automated teller machine (ATM) or the like to perform financial transactions. Thus, it will be understood that the transaction card can be embodied as an apparatus (e.g., a physical card, a mobile device, or the like), or as a virtual transaction mechanism (e.g., a digital transaction device, a virtual display of a transaction device, or the like).

Further regarding the block 110, it will be understood that the system having the process flow 100 can be configured to determine that a transaction card of the customer is comprised or lost in any way. For example, in some embodiments, the system is configured to determine a compromised or misplaced card by receiving a communication either directly or indirectly from the customer associated with the transaction card indicating that the transaction card is compromised. The system may receive the communication from the customer from a variety of channels accessible to the customer, including via telephone, e-mail, text message, social media, automated teller machine (ATM), branch banking center, online banking account, or the like. In no way should the methods or channels through which a customer may notify an issuer of a transaction card is compromised or lost be limited to the examples methods or channels described herein. It will also be understood that a combination of any of the methods or channels may be used by a customer to provide notification to the issuer indicating a compromised or lost transaction card. Further, it will be understood that receiving the communication from the customer associated with the transaction card may be a triggering event that causes the system to automatically implement a series of steps or concurrently execute one or more processes for protecting the customer. For example, in addition to initiating a remote revocation process, the system may automatically initiate one or more additional processes for (1) terminating or suspending the usability of the transaction card, (2) terminating or suspending the use of an account associated with the transaction card, (3) issuing notifications to merchants and other potential entities regarding the status of the transaction card, (4) automatically submitting a request and issuing a new or replacement transaction card to the customer, and/or other related processes for protecting the customer from loss and ensuring that the customer continues to have access to available funds or available credit associated with the compromised or misplaced transaction card.

Still regarding the block 110, it will be understood that the system may determine or identify certain other events that may also act as triggering events for initiating the one or more processes for protecting the customer from loss when the customer's transaction card is compromised or misplaced. For example, in some embodiments, the system is configured to determine that the transaction card is compromised based on a series of unusual transactions involving the transaction card. In such a circumstance, upon detecting the unusual transaction activity, the system may automatically initiate processes for remotely revoking access or functionality of a mobile device of the customer. In another example, in some embodiments, the system is configured to receive a manual or automated notification of unusual activity from a merchant or other third party (e.g., individual who finds lost transaction card, or the like) which would then trigger customer protection processes by the system. In yet another example, in some embodiments, the transaction card is a smart card that can be geographically located based on integrated global or local tracking technology or the like and the system is configured to determine that the transaction card is compromised or misplaced based on a determined location of the transaction card.

Regarding the block 120, it will be understood that the term "identify," as used herein, is meant to have its ordinary meaning (i.e., its ordinary dictionary definition) in addition to the one or more ordinary meanings of the following terms: discover, learn, calculate, observe, read, decide, determine, collect, conclude, verify, ascertain, and/or the like. Thus, in some embodiments, the system having process flow 100 is configured to identify one or more mobile devices associated with the compromised or misplaced transaction card of the customer based on determining that the transaction card is compromised or misplaced. For example, in some embodiments, the system is configured to identify any mobile device of the customer that is previously registered with the issuer of the transaction, such as the customer's bank. In such an example, upon registering the one or more mobile devices by the customer with the bank, the bank may automatically associate or operatively link the one or more mobile devices to some or all of the accounts of the customer. In particular, the bank may link the one or more mobile devices to any transaction card of the customer that is issued by the bank. In another example, in some embodiments, the bank associates or operatively links the one or more mobile devices of the customer to a customer profile that includes all of the customer's bank information (e.g., account information, transaction card information, and/or the like). In this way, because the one or more mobile devices are linked to the customer information, the system is configured to identify the one or more mobile devices of the customer by running a query to the customer accounts, profile, and/or the like.

As another example, in some embodiments, the system is configured to identify the one or more mobile devices of the customer based at least partially on determining the one or more mobile devices of the customer having a mobile application of the issuer of the transaction card stored onto a mobile or other is accessible to any of the customer's mobile devices. In this way, the system may easily determine any of the mobile devices of the consumer that uses its applications for managing the transaction card or managing the transaction card. For example, when the customer has a mobile banking application associated with its bank loaded onto his phone, the bank may be able to identify any download or upload records associated with the mobile banking application that identifies the customer. In such an example, analysis of the records by the system may help identify any mobile devices of the user.

In some embodiments, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

It will also be understood that the system having process flow 100 is configured to identify the one or more mobile devices of the customer in any way. For example, in some embodiments, the customer may indicate to the issuer of the transaction card the one or more mobile devices that the customer desires the system to identify.

Regarding the block 130, it will be understood that the apparatus having the process flow 100 is configured to determine the location of the one or more mobile devices of the customer in any way. For example, in some embodiments, is configured to receive geographic location information or position information of the one or more mobile devices directly or indirectly from the mobile devices, including by using various positioning systems or proximity systems (e.g., global positioning system (GPS) and/or the like). The geographic location information may include real-time or substantially real-time data or information relating to the physical location of the mobile devices of the customer. In another example, in some embodiments, the system is configured to use proximity sensors located at various locations throughout the world to detect the presence of the one or more proximity sensors associated with the mobile device. Yet in another example, in some embodiments, the consumer may provide the geographical location or position of the one or more mobile devices.

Referring now to block 140, it will be understood that the system having the process flow 100 is configured to remotely modify the functionality of the one or more mobile devices and/or modify the access or use rights of one or more applications accessible to any one or more of the mobile devices. For example, in some embodiments, the system is first configured to remotely and wirelessly establish a secured or unsecured connection with the mobile device. In such an example, the system may have access rights or authentication credentials to the mobile device such that upon submitting a request to the mobile device for making a connection, the mobile device may automatically grant such a request. Once a connection is established between the system and the mobile device, the system is configured to utilize any computer-based resources to operate, modify, and/or interact with the mobile device. During the connection between the system and the mobile device, the system may be configured to access any data accessible to the mobile device and/or any functionality of the mobile device. As such, the system may interact with the mobile device in such a way to limit the customer's exposure to any type of loss, including data loss or financial loss.

Still referring to block 140, it will be understood that the scope of access in which the system is configured to interact or modify the mobile device may be defined by the event that triggers the customer protective processes for remotely accessing the customer's mobile device. For example, in some embodiments, when it is indicated or reported to the system that the customer merely misplaced his transaction card and mobile device, but is aware of their locations; the scope of access of the system is limited to accessing the mobile device to disable or suspend the use of any financial-related software applications. In such an example, the scope of access of the system may also include the ability to limit a user's access or ability to use important financial information or data housed in the mobile device. In another example, in some embodiments, when it is reported to the system that the transaction card and mobile device are both compromised (e.g., the transaction and mobile device are misappropriated by another individual), the scope of access rights of the system may be broadened to include the ability to shut down the mobile device, make calls from the mobile device, send alerts or messages, copy and erase data from the mobile device, remove applications from the mobile device, deny access to all functionality or applications of the device, and/or similar modifications to the functionality of the mobile device that hinders the use of any features, data, or services associated with the mobile device.

Still at block 140, the system may be able to remotely access the mobile device of the user to create a backup of any and all data stored locally on the mobile device. In this way, the system provides containment for the user of the mobile device so that the user may easily have access to the data in containment by communicating with the system, which, in some embodiments, is maintained by a financial institution of the user. For example, the system may retrieve, copy, and store copies of digital access cards of the user, which may include insurance cards, identifications cards (e.g., driver's license, student identification, and the like). In such an example, the user may simply call the customer call center associated with the system and request that a copy of the digital access cards is provided to the user. Alternatively, the system may store in containment all of the user's data that is on the mobile device in such a way that the user can access the information in containment via an online banking platform or interface of his financial institution. For example, once the user is authenticated, via an online banking interface, for accessing or managing his one or more financial accounts, he may also navigate the online banking interface to access a containment file that includes a backup of all of the user's data from the phone that is compromised or lost. In another embodiment, the system may automatically communicate the information that was backed up from the mobile device of the user by sending an e-mail to the user or other package of information that includes the information from the mobile device.

In some embodiments, according to user preferences, the system may automatically communicate with one or more persons designated by the user or merchants. The communicate may comprise an alert indicating that the mobile device of the user is compromised or lost and possibly the information that was lost or compromised along with the mobile device.

Regarding the block 150, it will be understood that the system having process flow 100 is configured to provide a notification to the customer indicating that access to one or more application accessible to the mobile device are disabled. The notification from the system may also comprise a process or method for reinstating user access to the one or more applications or functionality of the mobile device. For example, in some embodiments, the system modifies the functionality of the mobile device and immediately thereafter, in real-time or substantially real-time, provides a communication to the user indicating that modifications to the customer's mobile device were made. In some embodiments, the notification to the customer indicates the data, features, applications, functionality, and/or the like of the mobile device that is disabled, suspended, retrieved, copied, and/or otherwise modified by the system for the protection of the customer.

Still regarding block 150, as another example, in some embodiments the notification to the customer includes a process, such as an authentication process, that would restore the mobile devices to its original state prior to the modifications of the system. For example, in some embodiments, when the mobile device is accessible to the customer or either in the customer's possession, the system is configured to provide a notification to the user requesting authentication credentials of the user. In such an example, upon successfully authenticating the user, the system is configured to restore the mobile device to a state prior to any modifications to the mobile device performed by the system. The restoration of the mobile device may provide the user access to data, features, applications, and other functionality of the mobile device.

It will further be understood that the system having the process flow 100 can be configured to perform any of the portions of the process flow 100 represented by blocks 110-150 upon or after one or more triggering events (which, in some embodiments, is one or more portions of process flow 100). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system having process flow 100 is configured such that the system receiving an indication of a compromised or lost transaction card (the triggering event) automatically and immediately or nearly immediately triggers the system to remotely access the mobile device of the customer and revoke privileges to one or more features of the mobile device (the triggered action).

Also, it will be understood that, in some embodiments, a predetermined time and/or the passage of a predetermined period of time may serve to trigger one or more of the portions represented by the blocks 110-150. It will also be understood that, in accordance with some embodiments, the system having the process flow 100 is configured to automatically perform one or more of the portions of the process flow 100 represented by the blocks 110-150, whereas in other embodiments, one or more of the portions of the process flow 100 represented by the blocks 110-150 require and/or involve human intervention. Of course, in addition to the system having the process flow 100, it will be understood that any of the embodiments described and/or contemplated herein can involve one or more triggering events, triggered actions, automatic actions, and/or human actions.

In addition, it will be understood that, in some embodiments, the system having the process flow 100 (and/or a user thereof) is configured to perform each portion of the process flow 100, from start to finish, within moments, seconds, and/or minutes (e.g., within approximately 10-15 minutes, etc.). In some embodiments, the system having the process flow 100 can be configured to perform one or more portions of the process flow 100 in real time, in substantially real time, and/or at one or more predetermined times. Further, it will be understood that the number, order, and/or content of the portions of the process flow 100 are exemplary and may vary. It will further be understood that the system having the process flow 100 can be configured to perform any one or more of the portions of any one or more of the embodiments described and/or contemplated herein, including, for example, any one or more of the portions of the process flow 300 described later herein.

Figure 2:
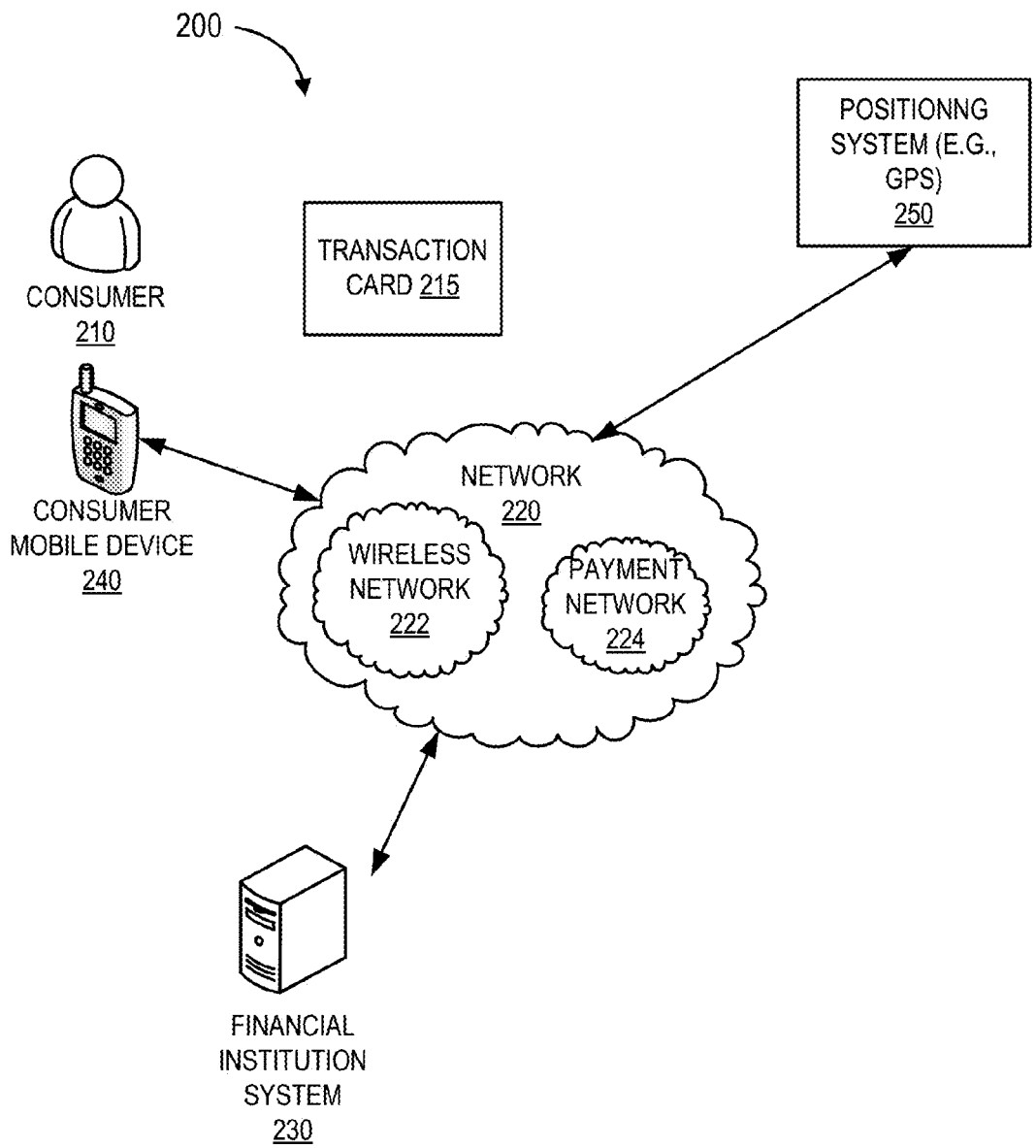
FIG. 2 illustrates an environment for facilitating remote access to a mobile device based on certain events, in accordance with an embodiment of the invention.

Referring now to the FIG. 2, FIG. 2 illustrates an environment 200 for facilitating remote access to a mobile device based on certain events, in accordance with an embodiment of the invention. As illustrated, the system 200 generally includes a consumer 210. The consumer 210 may be any individual or entity with the potential to purchase products from a merchant. The consumer 210 has a mobile device 240, such as a mobile phone, personal digital assistant (PDA), personal navigation device, personal web-surfing device, smart phone, tablet, or other personal/mobile computing device. Embodiments of the consumer mobile device 240 are described in greater detail in FIG. 2A and the accompanying description.

The consumer 210 also has a transaction card 215, such as, but not limited to, a bank card (e.g., a bank-issued credit or debit card). The transaction card 215 may be any transaction vehicle or any device that can be used by one or more of the systems described herein to identify any account or financial account (e.g., a credit account, debit account, demand deposit account, investment account, spending account, and/or the like) associated with the transaction card 215 and/or the consumer 210, thereby, allowing the consumer 210 to use the transaction card 215 to make transactions involving the financial account. In some embodiments, the consumer transaction card 215 and consumer mobile device 240 are combined into a single device. For example, in one embodiment, the consumer's mobile device 240 is equipped with near-field communication (NFC) capabilities that enable it to communicate with merchant point-of-sale (POS) devices so that the mobile device 240 can be used in place of a credit card. In some embodiments, transaction card 215 is separate from the mobile device 240 and also includes a NFC capabilities or related proximity sensor device. In some embodiments, the transaction card 215 uses NFC device to establish a connection with the mobile device 240. In this way, the transaction card 215 and the mobile device 240 may be in direct communication for determining a relative proximity of the two devices to each other. As used herein, a "financial transaction" may be, but is not limited to, a purchase, sale, return, withdrawal, deposit, money transfer, account inquiry, and/or the like.

Embodiments of the invention also include a network 220 the network may be any one or more devices or connections communicably coupling two or more devices. For example, the network 220 may include a global area network, such as the Internet, a wide area network, a local area network, a wireless network, a wire-line network, one or more modems, one or more servers, one or more relay devices, one or more direct electrical connections, one or more satellites, and/or the like. As illustrated, in some embodiments, the network 220 includes a wireless network 222, such as a cellular network or other mobile telephone/data network known in the art. As also illustrated, in some embodiments, the network 220 includes a payment network 224 for processing electronic or other payments and transferring money between banks and other entities. For example, the payment network may include the networks of one or more banks or other well-known payment network providers.

Embodiments of the present invention also include a positioning system 250, such as the well-known Global Positioning System (GPS) or other systems for identifying precise geographical locations of individuals or devices, or positions of individuals or devices relative to known objects or locations. For example, some embodiments of the invention include a positioning system that can identify the current latitude and longitude, and in some cases altitude, of the consumer's mobile device 240 using a sensor/transceiver in the consumer's mobile device 240 in conjunction with a satellite system and/or the wireless network 222. As another example, some embodiments of the invention include a positioning system that can determine a spatial and/or geographic location of a physical transaction card of a customer. In other embodiments, more local sensors/transceivers interact with sensors/transceivers of the consumer's mobile device 240 and/or transaction card 215 to determine if the consumer 210 is within a certain distance from a merchant and/or moving toward or away from the merchant. For example, in one embodiment of the invention, a merchant has sensors at its entrances that can communicate with consumer mobile device 240 that have NFC capabilities and, thereby, determine when a consumer 210 possessing the consumer mobile device 240 enters or leaves the merchant's facility.

Embodiments of the present invention may also include a financial institution system 230. The financial institution system 230 stores financial information for the consumer 210 and/or a merchant including financial transactions associated with the transaction card 215 and processes financial transactions for the consumer and/or the merchant.

The financial institution server 230 can include any server and/or apparatus described and/or contemplated herein. Additionally or alternatively, the financial institution server 230 can be configured to initiate, perform, complete, and/or facilitate any portion of any embodiment described and/or contemplated herein as being initiated, performed, completed, and/or facilitated by a server and/or apparatus. In some embodiments, the financial institution server 230 includes one or more servers, engines, mainframes, personal computers, ATMs, network devices, front end systems, back end systems, and/or the like. It will be understood that the server 230 may include a communication interface, a processor, and a memory, which may include one or more applications and/or datastores.

In some embodiments, the financial institution server 230 is configured (and/or an application thereof is executable) to remotely reconfigure or modify functionality of mobile device 240. As an example, the financial institution server may access mobile banking application 247, a similar or other application, in order to modify the functionality or other features of the phone. By accessing the mobile banking application 247, the system may use processor 244 to then reconfigure data or applications in memory 246 of the mobile device. Similarly, the financial institution server 230 may use processor 244 of the mobile device 240 to reconfigure any service or other functionality of mobile device 240, such as telecommunication services (e.g., text messaging, phone calls, and/or the like).

As described in greater detail below, in one embodiment of the financial institution system 230, a location of the mobile device 240 relative to a location of the transaction card 215 is tracked using the positioning system 250. The financial institution system 230 compares the location of the mobile device 240 and transaction card 215 to a proximity bridge or co-location zone associated with the transaction card 215 and the mobile transaction card 240. Based on the comparison, the financial institution system 230 may initiate one or more processes for protecting the user from loss when it is determined that the transaction card 215 and the mobile device 240 are not within the co-location zone.

In some embodiments, when the financial institution server 230 determines that the transaction card 215 is compromised server 230 is configured to: (1) identify a mobile device of the user that is associated with the transaction vehicle of the user that is compromised; (2) upon identifying the mobile device of the user, remotely access the mobile device of the user; and (3) reconfigure one or more applications accessible to the mobile device or one or more functional features of the mobile device based at least partially on receiving the indication. As another example, the financial institution server 230 is configured to: (a) monitor one or more transaction involving a transaction vehicle of a user; (b) determine a physical location of a transaction vehicle based at least partially on the one or more transactions; (c) determine a geographic location of a mobile device of the user, wherein the mobile device is associated with the transaction vehicle; (d) determine whether or not the transaction vehicle of the user and the mobile device of the user are co-located; and (e) reconfigure one or more applications accessible to the mobile device or one or more functional features of the mobile device based at least partially on determining that the mobile device and the transaction vehicle of the user are not co-located.

In some embodiments, the financial institution server 230 is configured to communicate with one or more other portions of the system 200, such as, for example, the datastore 203, the mobile device 240, and/or vice versa. Also, in some embodiments, the s financial institution server 230 includes one or more applications, where those one or more applications include one or more computer-executable program code portions for causing and/or instructing the processor of the financial institution server 230 to perform one or more of the functions of the financial institution server 230 described and/or contemplated herein. In some embodiments, the financial institution server 230 includes and/or uses one or more network and/or system communication protocols.

Figure 2A:
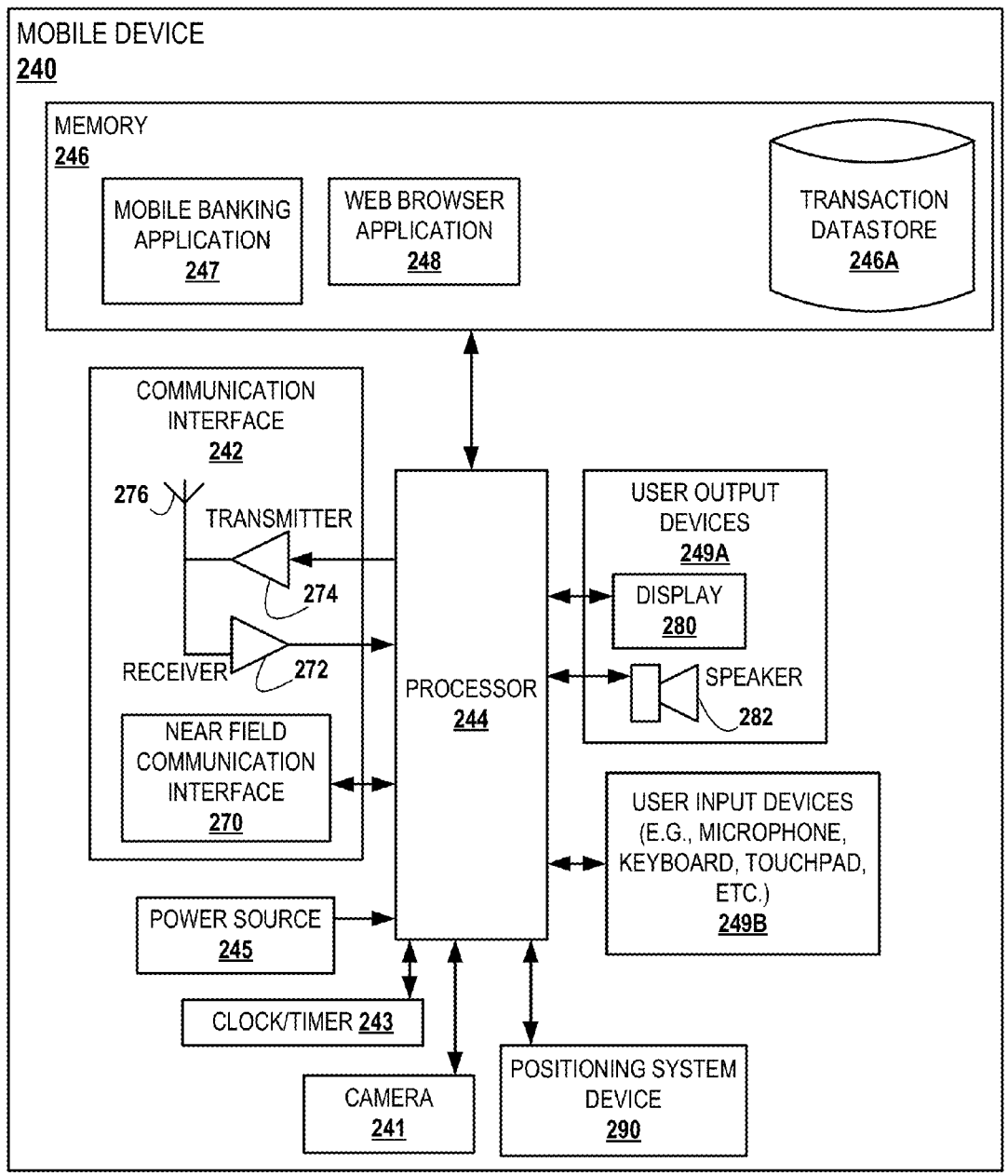
FIG. 2A is a block diagram illustrating technical components of a mobile device of a customer, in accordance with various embodiments of the present invention.

Referring now to FIG. 2A, a block diagram is provided that illustrates the mobile device 240 of FIG. 2 in more detail, in accordance with an embodiment of the present invention. In some embodiments, the mobile device 240 is a mobile phone, but in other embodiments, the mobile device 240 can include and/or be embodied as any other mobile device described and/or contemplated herein. The mobile device 240 can be configured to initiate, perform, transmit, complete, and/or facilitate any portion of any embodiment described and/or contemplated herein as being initiated, performed, completed, and/or facilitated by a mobile device. As shown in FIG. 2A, the mobile device 240 includes a processor 244 operatively connected to memory 246, user output devices 249A, user input devices 249B, a communication interface 242, a power source 245, a clock or other timer 243, a camera 241, and a positioning system device 290.

The processor 244 may include the functionality to encode and interleave messages and data prior to modulation and transmission. The processor 244 can additionally include an internal data modem. Further, the processor 244 may include functionality to operate one or more software programs, which may be stored in the memory 246. For example, the processor 244 may be capable of operating a connectivity program, such as a web browser application 248. The web browser application 248 may then allow the mobile device 240 to transmit and receive web content, such as, for example, location-based content and/or other web page content, according to a Wireless Application Protocol (WAP), Hypertext Transfer Protocol (HTTP), and/or the like.

The processor 244 is configured to use the communication interface 242 to communicate with one or more other devices on the network 220. In this regard, the communication interface 242 includes an antenna 276 operatively coupled to a transmitter 274 and a receiver 272 (together a "transceiver"). The processor 244 is configured to provide signals to and receive signals from the transmitter 274 and receiver 272, respectively. The signals may include signaling information in accordance with the air interface standard of the applicable cellular system of the wireless telephone network 222. In this regard, the mobile device 240 may be configured to operate with one or more air interface standards, communication protocols, modulation types, and access types. By way of illustration, the mobile device 240 may be configured to operate in accordance with any of a number of first, second, third, and/or fourth-generation communication protocols and/or the like. For example, the mobile device 240 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 240 may also be configured to operate in accordance with non-cellular communication mechanisms, such as via a wireless local area network (WLAN) or other communication/data networks.

The communication interface 242 of the mobile device 240 may also include an NFC interface 270. The NFC interface 270 is configured to contactlessly and/or wirelessly send and/or receive information over relatively short ranges (e.g., within four inches, within three feet, etc.). The NFC interface 270 may include a transmitter, receiver, smart card, key card, proximity card, radio frequency identification (RFID) tag and/or reader, and/or the like. In some embodiments, the NFC interface 270 communicates information via radio, IR, and/or optical transmissions. In some embodiments, the NFC interface 270 is configured to operate as an NFC transmitter and/or as an NFC receiver (e.g., an NFC reader, etc.). In some embodiments, the NFC interface 270 enables the mobile device 240 to operate as a mobile wallet. As another example, in some embodiments, the NFC interface 270 enables the mobile device 240 to wirelessly receive signals from the transaction card 215 in order to determine the relative position of the transaction card 215. Also, it will be understood that the NFC interface 270 may be embedded, built, carried, and/or otherwise supported in and/or on the mobile device 240. In some embodiments, the NFC interface 270 is not supported in and/or on the mobile device 240, but the NFC interface 270 is otherwise operatively connected to the mobile device 240 (e.g., where the NFC interface 270 is a peripheral device plugged into the mobile device 240, etc.). Other apparatuses having NFC interfaces mentioned herein may be configured similarly including transaction card 215.

In some embodiments, the NFC interface 270 of the mobile device 240 is configured to contactlessly and/or wirelessly communicate information to and/or from a corresponding NFC interface of another apparatus. For example, in some embodiments, the mobile device 240 is a mobile phone, the NFC interface 270 is a smart card that receives transaction information from the transaction card 215. In some embodiments, when the mobile phone and/or smart card is brought within a relatively short range of an NFC reader of the transaction card 215, the smart card is configured to wirelessly and/or contactlessly send position information of the mobile phone to the NFC reader of the transaction card 215.

In addition to the NFC interface 270, the mobile device 240 can have a user interface 249 that is, like other user interfaces described herein, made up of one or more user output devices 249A and/or user input devices 249B. The user output devices 249A include a display 280 (e.g., a liquid crystal display, a touchscreen display, and/or the like) and a speaker 282 and/or other audio device, which are operatively coupled to the processor 244. The user input devices 249B, which allow the mobile device 240 to receive data from a user such as the consumer 210, may include any of a number of devices allowing the mobile device 240 to receive data from a user, such as a keypad, keyboard, touch-screen, touchpad, microphone, mouse, joystick, other pointer device, button, soft key, and/or other input device(s). The user interface 249 may also include a camera 241, such as a digital camera.

In some embodiments, the mobile device 240 also includes a positioning system device 290 that can be used to determine the location of the mobile device 240. For example, the positioning system device 290 may include a GPS transceiver. In some embodiments, the positioning system device 290 is at least partially made up of the antenna 276, transmitter 274, and receiver 272 described above. For example, in one embodiment, triangulation of cellular signals may be used to identify the approximate location of the mobile device 240. In other embodiments, the positioning system device 290 includes a proximity sensor and/or transmitter, such as an RFID tag, that can sense or be sensed by devices known to be located proximate an ATM and/or other locations to determine that the mobile device 240 is located proximate these known devices.

The mobile device 240 further includes a power source 245, such as a battery, for powering various circuits and other devices that are used to operate the mobile device 240. Embodiments of the mobile device 240 may also include a clock or other timer 243 configured to determine and, in some cases, communicate actual or relative time to the processor 244 or one or more other devices.

The mobile device 240 also includes a memory 246 operatively connected to the processor 244. The memory 246 can store any of a number of applications which may include computer-executable program code executed by the processor 244 to implement the functions of the mobile device 240 described herein. For example, the memory 246 may include such applications as a web browser application 248 and/or a mobile banking application 247. In some embodiments, when it is determined that mobile device 240 is compromised or lost, the financial institution system 230 accesses the functionality of the mobile device 240 via the mobile banking application 247. In such embodiments, the financial institution system 230 can modify or reconfigure the functionality of the mobile device 240 or applications and features thereof, including the mobile banking application 247. It will be understood that the web browser application 248 and/or the mobile banking application 247 can be, individually or collectively, operable to initiate, perform, complete, and/or facilitate one or more portions of any embodiment described and/or contemplated herein, such as, for example, any one or more portions of the process flows 100 and/or 300 described herein.

For example, in some embodiments, the mobile banking application 247 is executable to authenticate the consumer 210 and/or the financial institution system 230. As another example, in some embodiments, the mobile banking application 247 is executable to prompt (e.g., via the user interface 249) the consumer 210 to input, into the mobile device 240, information for initiating one or more transactions. As still another example, in some embodiments, the mobile banking application 247 is executable to initiate one or more transaction card requests. As another example, in some embodiments, the mobile banking application 247 is executable to store transaction information associated with one or more transactions involving the transaction card in datastore 246A and/or elsewhere in the memory 246. As still another example, in some embodiments, the mobile banking application 247 is executable to present information associated with one or more transactions involving the transaction card 215 to the consumer 210. As another example, in some embodiments, the mobile banking application 247 is executable to transfer information associated with the one or more transactions involving the transaction card 215 directly and/or indirectly between the mobile device 240 and the financial institution server 230.

In some embodiments, the mobile banking application 247 and/or the web browser application 248 are executable to enable the consumer 210 and/or mobile device 240 to communicate with one or more other portions of the system 200, and/or vice versa. In some embodiments, the mobile banking application 247 and/or the web browser application 248 is additionally or alternatively executable to initiate, perform, complete, and/or otherwise facilitate one or more financial and/or non-financial transactions. In some embodiments, the mobile banking application 247 and/or the web browser application 248 includes one or more computer-executable program code portions for causing and/or instructing the processor 244 to perform one or more of the functions of the mobile banking application 247, web browser application 248, and/or mobile device 240 described and/or contemplated herein. In some embodiments, the mobile banking application 247 and/or the web browser application 248 includes and/or uses one or more network and/or system communication protocols.

In some embodiments, the mobile banking application 247 and/or the web browser application 248 are executable to render and/or otherwise provide a graphical user interface on the display 280 that allows the consumer 210 to communicate with the mobile device 240, the financial institution server 230, and/or one or more other portions of the system 200. In some embodiments, the consumer 210 can use the mobile banking application 247 and/or the web browser application 248 to access the electronic banking account 209 (e.g., mobile banking account, etc.) that is associated with the deposit account 204. The memory 246 can also store any type and/or amount information used by the mobile device 240, and/or used by the applications and/or the devices that make up the mobile device 240 and/or that are in communication with the mobile device 240, to implement the functions of the mobile device 240 and/or the other systems described and/or contemplated herein. For example, in some embodiments, the memory 246 stores account information (e.g., routing and/or account numbers, account names, etc.), authentication information (e.g., username/passwords, PINs, tokens, biometric information, etc.) associated with one or more transaction cards in the memory 246.

Figure 2B:
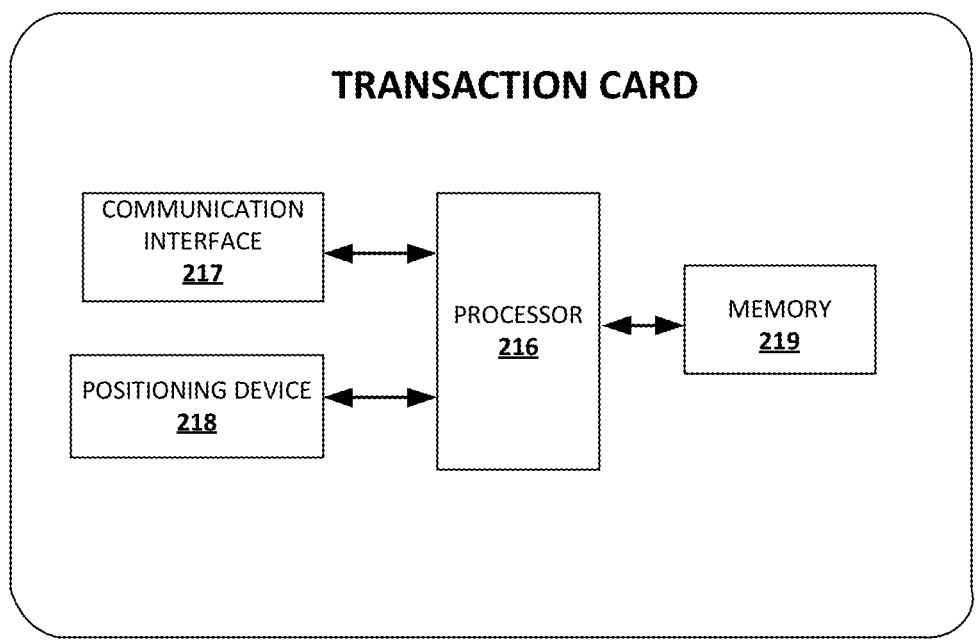
FIG. 2B illustrates an example transaction vehicle with smartcard capabilities, in accordance with some embodiments of the present invention.

FIG. 2B illustrates the transaction card 215 of FIG. 2 in more detail, in accordance with an embodiment of the present invention. In some embodiments, the transaction device 215 is a credit and/or debit card, but in other embodiments, the transaction card 215 can include and/or be embodied as any other transaction vehicle described and/or contemplated herein. The transaction card 215 can be configured to initiate, perform, transaction, complete, and/or facilitate various portions of any embodiments described and/or contemplated herein. As shown in FIG. 2B, the transaction card 215 includes a processor 216 operatively connected to communication interface 217, positioning device 218, and memory 219. It will be understood that transaction device 215 may include various other features or components not necessarily described herein or shown in FIG. 2B, such as input and output devices, a power source, clock/timer, applications, and/or the like.

The communication interface 217 of the transaction card 215 may also include a near field communication (NFC) interface (not shown). The NFC interface of transaction device 215 may have and/or include any or all the functionality of NFC interface 270 of the mobile device 240, as described above. In particular, NFC interface of the transaction card 215 enables the transaction device 215 to communicate with the mobile device 240 by transmitting and receiving messages between the NFC interface of the transaction card 215 and the NFC interface 270 of the mobile device 240. In this way, the transaction card 215 using positioning device 218 may determine a location of the transaction device 215 and subsequently communicate the determined location via of the transaction device 215 to the mobile device 240 via the NFC interface of the transaction device 215. It will also be understood that positioning device 218 of the transaction device 215 may have and/or include any or all the functionality of positioning system device 290 of the mobile device 240, as described above.

Revocation of Application Access Based on Non-Co-Located Card

In general terms, embodiments of the present invention relate to methods, system, and computer program products for remotely revoking application authentication/access or other functionality of a mobile device of the customer when it is determined that the mobile is not co-located with the customer's transaction card or based on other certain events. For example, some embodiments of the present invention are configured to determine the location of the mobile device of the customer. As another example, some embodiments of the present invention are configured to determine the location of a transaction card of the customer. As yet another example, some embodiments of the present invention is configured to determine when the mobile device of the customer and the transaction card of the customer are not co-located. As still another example, some embodiments of the present invention are configured to remotely disable access to applications or features of the mobile device of the customer based on determining that the transaction card of the customer is not co-located with the mobile device of the customer.

Figure 3:
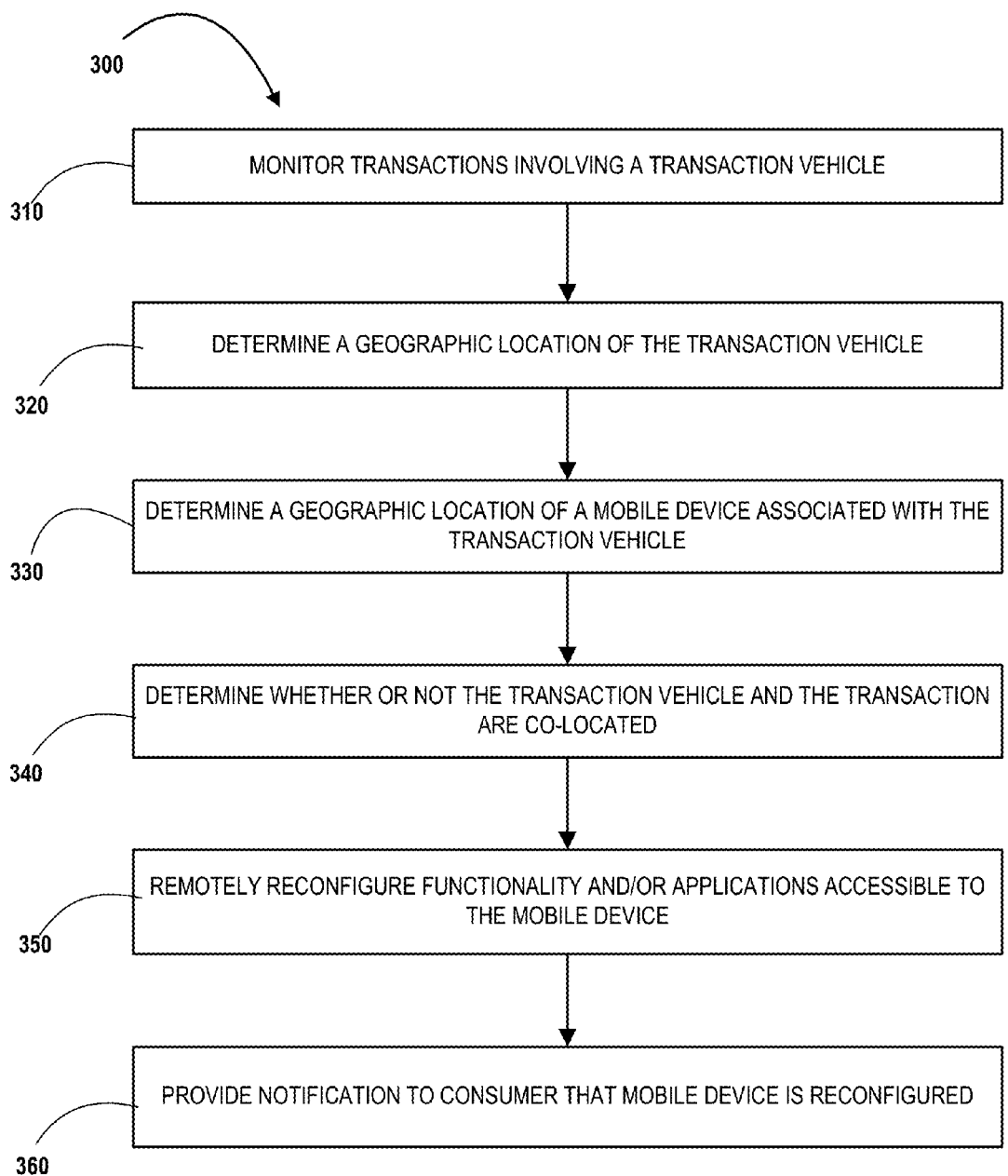
FIG. 3 illustrates a general process flow 300 of a system for remotely revoking access to applications or functions of a mobile device of a customer based at least partially on determining that the mobile device of the customer and the transaction card are not co-located, in accordance with various embodiments of the present invention.

Referring now to FIG. 3, a general process flow 300 of a system for remotely revoking access to applications or functions of a mobile device of a customer based at least partially on determining that the mobile device of the customer and the transaction card are not co-located. As represented by block 310, the system is configured to monitor transactions involving a transaction card of a customer. As represented by the block 320, the system is configured to determine a geographic location of the transaction card based at least partially on recent transactions involving the transaction card. As then represented by block 330, the system is configured to determine a geographic location of a mobile device of a customer associated with the transaction card. As further represented by the block 340, the system is configured to determine whether or not the mobile device of the customer and the transaction card of the customer are co-located. As represented by the block 350, the system is configured to remotely revoke access or use of features and/or applications of the mobile device based at least partially on determining that the transaction card of the customer is not co-located with the mobile device of the customer. As also represented by the block 360, the system is configured to provide a notification to the customer indicating that access to one or more applications accessible to the mobile device are disabled and a process for reinstating user access to the one or more applications.

Accordingly, the system having the process flow 300 enables a financial institution or issuer of a transaction cards to remotely access a mobile device of a customer in order to modify its functionality upon the occurrence of certain events, such as, determining that a transaction card and a mobile device that are linked together are not co-located when a recent transaction involving the transaction is detected. As such, in certain circumstances when the customer is unaware that a transaction card is lost or compromised, the system may automatically detect potentially unusual circumstances or transactions that may potentially cause the customer a financial loss due to unauthorized transaction activity involving the transaction card. And further, in this way, if the mobile device is also compromised, the system may intervene on behalf of the customer to disable functionality or applications of the mobile device in order to protect the customer's financial and/or personal interests.

Regarding the block 310, it will be understood that the term "monitor," as used herein, is meant to have its ordinary meaning (i.e., its ordinary dictionary definitions) in addition to the one or more ordinary meanings of the following terms: discover, learn, observe, read, collect, verify, determine, track, check, watch, and/or the like. Thus, in some embodiments, the system having process flow 100 is configured to monitor any and all transactions involving the transaction card of the customer by reading the transaction information associated with any transaction involving the transaction card. For example, in some embodiments, the system is configured to monitor that the transaction of a customer was involved in a recent transaction to purchase items for "$10" because a transaction amount of "$10" appears in the electronic transaction records for an account that is linked to the transaction card. However, in other embodiments, the system having the process flow 100 is not able to access transaction records for the transaction card and must monitor the transactions involving the transaction card another way. For example, in some embodiments, the system is configured to monitor the occurrence of transactions involving the transaction card of the customer based on identifying merchant requests for payment from the transaction card. In such an example, during a transaction involving the transaction card, a merchant involved in a transaction involving the transaction makes a request to the system or issuer of the transaction card for a payment of "$10" and when the request is made, the system is configured to identify from merchant payment request records that a request for a payment amount of "$10" was made by a particular merchant.

It will be understood that the system is configured to monitor the transactions of the transaction card in any way. For example, in some embodiments, the transaction card is a smart card that is configured to report any and all transaction activity directly to the system or indirectly to the system via the issuer of the transaction card or the like.

Regarding the block 320, it will be understood that the system having process flow 300 is configured to determine the geographic location of the transaction card in any way. For example, in some embodiments, the system is configured to determine the location of the transaction card based on information associated with the most recent transactions involving the transaction card. In such an example, the information associated with the most recent transactions includes merchant location information, time of purchase, items or services purchased, and/or the like. The system is configured to analyze the information and interpolate the transaction cards estimate geographic location based on the merchant location information identified from the transaction. As another example, the system is configured to identify the location of the transaction card based on information associated with proximity sensors located in the transaction card and/or around the transaction card. In such an example, the system is configured to retrieve and/or receive transaction card proximity information from either the transaction card or from the proximity sensors that detects the presence of the transaction card.

Still regarding block 320, it will be understood that, in some embodiments, the system is configured to determine the location of the transaction card based on information obtained from the mobile device of the customer. In some embodiments, the mobile device of the customer comprises a proximity system or sensor that is operatively linked to a positioning system and/or proximity sensor of the transaction card. For example, in some embodiments, the mobile device of the customer continually or periodically scans for the transaction card. Once the mobile device locates the transaction card, the mobile device may be configured to transmit the transaction location information to the system. Alternatively, in some embodiments, once the mobile device of the customer determines the location of the transaction card, the system is configured to retrieve the transaction card location information from the mobile device. In yet another example, the mobile device attempts to locate the transaction card based on a recent occurrence of a transaction involving the transaction card. In such an example, when a transaction involving the transaction card has occurred or is in process, the system is configured to prompt the mobile device to scan for a location of the transaction card.

Regarding the block 330, it will be understood that the system having process flow 300 is configured to determine the location of the mobile device of the customer in any way. For example, in some embodiments, is configured to receive geographic location information or position information of the mobile device of the customers directly or indirectly from the mobile device, including by using various positioning systems or proximity systems (e.g., global positioning system (GPS) and/or the like). The geographic location information may include real-time or substantially real-time data or information relating to the physical location of the mobile device of the customer. In another example, in some embodiments, the system is configured to use proximity sensors located at various locations throughout the world to detect the presence of the one or more proximity sensors of the mobile device. Yet in another example, in some embodiments, the consumer may provide the geographical location or position of the mobile device.

Regarding the block 340, it will be understood that the term "co-located," as used herein, is meant to have its ordinary meaning (i.e., its ordinary dictionary definition) in addition to the one or more ordinary meanings of the following terms, depending on circumstances: close proximity, same location, and/or the like. In some embodiments, co-location between two objects, such as the mobile device of the customer and a transaction card of the customer, is spatially defined. In such embodiments, the system is configured to determine an optimal distance between the mobile device and the transaction that defines when the two objects are co-located thereby further establishing a "co-location zone." So that when the two objects are outside of this defined distance, they are no longer co-located. For example, in some embodiments, the system defines that when the transaction device and the mobile device of a customer are ten feet (10 ft.) or less apart, then the two objects are co-located. And, in such an example, any incremental distance of separation between the transaction card and the mobile device above or beyond 10 ft., then the two objects would not be considered co-located. In yet another example, the system is configured to receive from a distance from the customer for defining co-location of the mobile device and the transaction card of the customer. Receiving, from the customer, the distance for co-location of the devices may be done at any time. For example, in some embodiments, a customer may enroll into a remote access program provided by his bank. During the enrollment, the customer may register one or more mobile devices with the bank, so that the mobile devices are operatively linked or otherwise associated to the transactions cards of the customer. Similarly, during the enrollment, the customer may provide preferences indicating a distance in which the customer desires the transaction card and the mobile device to be considered co-located by the system.

Still regarding block 340, thus, in some embodiments, the system having the process flow 300 is configured to determine whether or not the mobile device of the customer and the transaction card are co-located. The system may determine whether or not the transaction card of the customer and the mobile device of the customer are co-located in a number of ways. For example, in some embodiments, the system is configured to determine the co-location of the transaction card and the mobile device based at least partially on receiving geo-location information of both the mobile device and the transaction card of the customer. In another example, the system is configured to determine co-location of the transaction card and the mobile device based on receiving geo-location information of the mobile device and receiving the most recent transaction of the transaction card. In such an example, in some embodiments, the system is configured to determine co-location when a time stamped geo-location of the mobile device and a time stamped recent transaction information that includes merchant location indicate that the transaction card and the mobile device are in a defined proximity for co-location.

Still yet regarding block 340, the system is also configured to determine whether or not the transaction card and the mobile device are co-located based on receiving a co-location indication from either the mobile device and/or the transaction card. For example, in some embodiments of this invention, the system is configured to determine that the transaction card and the mobile device are not co-located when a proximity bridge is broken or does not exist between the devices. Similarly, in some embodiments, the system determines that the transaction card and the mobile device are co-located when the proximity bridge between the two devices is intact and not broken. A proximity bridge between the transaction card and the mobile device of the customer may be established in several ways. In one example, in some embodiments, the proximity bridge is established between a proximity sensor of the transaction card and a proximity sensor of the mobile device. In such an example, a customer or the system defines a distance range that the proximity sensors of the transaction card and the mobile device should fall within and from each other in order to establish the proximity bridge (e.g., "co-location zone", and/or the like). Continuing with the example, the customer may define that a proximity bridge exists between the transaction card and the mobile device when the proximity sensors of each device are five feet (5 ft.) or less apart. Alternatively, a proximity bridge may be defined between the transaction card and the mobile device defining a distance range for the proximity bridge that is based on determining a geo-location of each device using positioning systems, such as GPS. Thus, in some embodiments, when either the mobile device or the transaction card of the customer determines that the proximity bridge between the transaction card and the mobile device is broken, then the system is configured to receive an indication from the transaction card or the mobile device that the proximity bridge is broken.

Referring now to block 350, it will be understood that the system having the process flow 300 is configured to remotely modify the functionality of the mobile device and/or modify the access or use rights of one or more applications accessible to the mobile device. For example, in some embodiments, the system is first configured to remotely and wirelessly establish a secured or unsecured connection with the mobile device. In such an example, the system may have access rights or authentication credentials to the mobile device such that upon submitting a request to the mobile device for establishing a connection, the mobile device may automatically grant such a request. Once a connection is established between the system and the mobile device, the system is configured to utilize any computer-based resources to operate, modify, and/or interact with the mobile device. During the connection between the system and the mobile device, the system is configured to access any data accessible to the mobile device and/or any functionality of the mobile device. As such, the system may interact with the mobile device in such a way to limit the customer's exposure to any type of loss, including data loss or financial loss.

Still referring to block 350, it will be understood that the scope of access in which the system is configured to interact or modify the mobile device may be defined by the extent to which the transaction card and the mobile device are not co-located and/or based on an event that triggers the customer protective processes for remotely accessing the customer's mobile device. For example, in some embodiments, when the system determines that the transaction card and the mobile device of the customer are not co-located due to be a marginal distance (e.g., 1 ft.-10 ft., or the like) outside of a co-location zone for the devices, the system is configured to intervene at the customer's mobile device, such that the scope of intervention is at a minimal level. In such an example, the system is configured to modify a mobile banking on the mobile device to request full authentication of the user. Alternatively, the system is configured to disable access to the mobile banking application until the mobile device is returned into the co-location zone. In another example, in some embodiments, when the system determines that the transaction card and the mobile device are a considerable distance apart (e.g., 2 mi.-300 mi., or the like), the system is configured to intervene at the mobile device of the customer, such that the scope of the intervention is significant. The system is configured to, in such an example, remotely access the mobile device disable any and all features and functionality of the mobile device, such that the mobile banking application, customer data, and any other information or resource/service of the mobile device is not accessible by any user other than the customer (e.g., the scope of access rights of the system may be broadened to include the ability to shut down the mobile device, make calls from the mobile device, send alerts or messages, copy and erase data from the mobile device, remove applications from the mobile device, deny access to all functionality or applications of the device, and/or similar modifications to the functionality of the mobile device that hinders the use of any features, data, services associated with the mobile device, and/or the like).

Regarding the block 360, it will be understood that the system having process flow 300 is configured to provide a notification to the customer indicating that access to one or more application accessible to the mobile device are disabled. The notification from the system may also comprise a process or method for reinstating user access to the one or more applications or functionality of the mobile device. For example, in some embodiments, the system modifies the functionality of the mobile device and immediately thereafter, in real-time or substantially real-time, provides a communication to the user indicating that modifications to the customer's mobile device were made. In some embodiments, the notification to the customer indicates the data, features, applications, functionality, and/or the like of the mobile device that is disabled, suspended, retrieved, copied, and/or otherwise modified by the system for the protection of the customer.

Still regarding block 360, as another example, in some embodiments the notification to the customer includes a process, such as an authentication process, that would restore the mobile devices to its original state prior to the modifications of the system. For example, in some embodiments, when the mobile device is accessible to the customer or either in the customer's possession, the system is configured to provide a notification to the user requesting authentication credentials of the user. In such an example, upon successfully authenticating the user, the system is configured to restore the mobile device to a state prior to any modifications to the mobile device performed by the system. The restoration of the mobile device may provide the user access to data, features, applications, and other functionality of the mobile device.

It will further be understood that the apparatus having the process flow 300 can be configured to perform any of the portions of the process flow 300 represented by blocks 310-360 upon or after one or more triggering events (which, in some embodiments, is one or more portions of process flow 300). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system having process flow 300 is configured such that the system receiving an indication of a compromised or lost transaction card (the triggering event) automatically and immediately or nearly immediately triggers the system to remotely access the mobile device of the customer and revoke privileges to one or more features of the mobile device (the triggered action).

Also, it will be understood that, in some embodiments, a predetermined time and/or the passage of a predetermined period of time may serve to trigger one or more of the portions represented by the blocks 310-360. It will also be understood that, in accordance with some embodiments, the system having the process flow 300 is configured to automatically perform one or more of the portions of the process flow 300 represented by the blocks 310-360, whereas in other embodiments, one or more of the portions of the process flow 100 represented by the blocks 310-360 require and/or involve human intervention. Of course, in addition to the system having the process flow 300, it will be understood that any of the embodiments described and/or contemplated herein can involve one or more triggering events, triggered actions, automatic actions, and/or human actions.

In addition, it will be understood that, in some embodiments, the system having the process flow 300 (and/or a user thereof) is configured to perform each portion of the process flow 300, from start to finish, within moments, seconds, and/or minutes (e.g., within approximately 10-15 minutes, etc.). In some embodiments, the system having the process flow 300 can be configured to perform one or more portions of the process flow 300 in real time, in substantially real time, and/or at one or more predetermined times. Further, it will be understood that the number, order, and/or content of the portions of the process flow 300 are exemplary and may vary. It will further be understood that the system having the process flow 300 can be configured to perform any one or more of the portions of any one or more of the embodiments described and/or contemplated herein, including, for example, any one or more of the portions of the process Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. Patent Application Ser. No. | Title | Filed On |
| --- | --- | --- |
| 14/175,639 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 14/175,643 | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 14/175,646 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 14/175,701 | USER AUTHENTICATION BASED ON HISTORICAL TRANSACTION DATA | Feb. 7, 2014 |
| 14/175,947 | USER AUTHENTICATION BASED ON HISTORICAL USER BEHAVIOR | Feb. 7, 2014 |
| 14/175,954 | USER AUTHENTICATION BY GEO-LOCATION AND PROXIMITY TO USER'S CLOSE NETWORK | Feb. 7, 2014 |
| 14/175,863 | USER AUTHENTICATION BASED ON OTHER APPLICATIONS | Feb. 7, 2014 |
| 14/175,615 | USER AUTHENTICATION BASED ON FOB/INDICIA SCAN | Feb. 7, 2014 |
| 14/175,688 | USER AUTHENTICATION BASED ON SELF-SELECTED PREFERENCES | Feb. 7, 2014 |
| 14/175,672 | SELF-SELECTED USER ACCESS BASED ON SPECIFIC AUTHENTICATION TYPES | Feb. 7, 2014 |
| 14/175,136 | SHUTTING DOWN ACCESS TO ALL USER ACCOUNTS | Feb. 7, 2014 |
| 14/175,146 | PROVIDING AUTHENTICATION USING PREVIOUSLY-VALIDATED AUTHENTICATION CREDENTIALS | Feb. 7, 2014 |
| 14/175,652 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 14/175,956 | SORTING MOBILE BANKING FUNCTIONS INTO AUTHENTICATION BUCKETS | Feb. 7, 2014 |
| 14/175,962 | AUTHENTICATION LEVEL OF FUNCTION BUCKET BASED ON CIRCUMSTANCES | Feb. 7, 2014 |
| 14/175,771 | REMOTE REVOCATION OF APPLICATION ACCESS BASED ON LOST OR MISAPPROPRIATED CARD | Feb. 7, 2014 |

What is claimed is:

1. A system for accessing a remotely located mobile device of a user, the system comprising:
   a computer apparatus including a processor and a memory; and
   a software module stored in the memory, comprising executable instructions that when executed by the processor cause the processor to:
      monitor one or more transactions involving a physical payment transaction vehicle of a user, wherein the payment transaction vehicle includes a positioning device;

determine, via the positioning device on the transaction vehicle, a geographic location of the payment transaction vehicle based at least partially on the one or more transactions;

determine, via a positioning device in a mobile device of the user, a geographic location of the mobile device, wherein the mobile device is associated with the payment transaction vehicle;

determine whether the payment transaction vehicle of the user and the mobile device of the user are co-located, based on a predefined proximity bridge, which is a distance range between the geographic location of the payment transaction vehicle and the geographic location of the mobile device and is predefined by the user or the system, wherein the mobile device and the payment transaction vehicle are not co-located if the geographic location of the mobile device and the geographic location of the payment transaction vehicle are not within the predefined proximity bridge;

disable functionality of one or more applications or one or more features on the mobile device, based at least partially on determining that the mobile device and the payment transaction vehicle are not co-located, wherein disabling comprises reconfiguring the one or more applications or the one or more features on the mobile device; and provide a notification to the user indicating that functionality of the one or more applications or the one or more features accessible to the mobile device are disabled.

2. The system of claim 1, wherein the executable instructions further causes the processor to provide a notification to the user indicating that one or more applications to the mobile device or one or more functional features of the mobile device are reconfigured.

3. The system of claim 1, wherein the transaction vehicle comprises a bank card, a debit card, a credit card, a loyalty card, a resource access card, a virtual transaction card, or a combination any of the fore-mentioned card types.

4. The system of claim 3, wherein the executable instructions further causes the processor to provide a prompt, to the mobile device, requiring full authentication of the user prior to restoring the mobile device to an original state prior to the reconfiguration.

5. The system of claim 3, wherein the mobile device of the user and the payment transaction vehicle of the user are co-located when the mobile device and the payment transaction vehicle are within a predefined distance of each other.

6. The system of claim 3, wherein the mobile device of the user and the payment transaction vehicle of the user are co-located when it is determined that the mobile device and the payment transaction vehicle are within a predefined distance of each other upon a completion of a most recent transaction involving the payment transaction vehicle.

7. The system of claim 3, wherein reconfiguring the one or more applications accessible to the mobile device comprises disabling access to one or more financial applications including a mobile banking application associated with a financial institution of the user.

8. A computer program product for accessing a remotely located mobile device of a user, the computer program product comprising a non-transitory computer-readable medium, wherein the non-transitory computer-readable medium comprises one or more computer-executable program code portions that, when executed by a computer, cause the computer to:

monitor one or more transactions involving a physical payment transaction vehicle of a user, wherein the payment transaction vehicle includes a positioning device;

determine, via the positioning device on the transaction vehicle, a geographic location of the payment transaction vehicle based at least partially on the one or more transactions;

determine, via a positioning device in a mobile device of the user, a geographic location of the mobile device, wherein the mobile device is associated with the payment transaction vehicle;

determine whether the payment transaction vehicle of the user and the mobile device of the user are co-located, based on a predefined proximity bridge, which is a distance range between the geographic location of the payment transaction vehicle and the geographic location of the mobile device and is predefined by the user or the system, wherein the mobile device and the payment transaction vehicle are not co-located if the geographic location of the mobile device and the geographic location of the payment transaction vehicle are not within the predefined proximity bridge;

disable functionality of one or more applications or one or more features on the mobile device, based at least partially on determining that the mobile device and the payment transaction vehicle are not co-located, wherein disabling comprises reconfiguring the one or more applications or the one or more features on the mobile device; and provide a notification to the user indicating that functionality of the one or more applications or the one or more features accessible to the mobile device are disabled.

9. The computer program product of claim 8, wherein the computer program code further comprises one or more executable program portions that cause the computer to provide a notification to the user indicating that one or more applications to the mobile device or one or more functional features of the mobile device are reconfigured.

10. The computer program product of claim 8, wherein the transaction vehicle comprises a bank card, a debit card, a credit card, a loyalty card, a resource access card, a virtual transaction card, or a combination any of the fore-mentioned card types.

11. The computer program product of claim 10, wherein the computer program code further comprises one or more executable program portions that cause the computer to provide a prompt, to the mobile device, requiring full authentication of the user prior to restoring the mobile device to an original state prior to the reconfiguration.

12. The computer program product of claim 10, wherein the mobile device of the user and the transaction vehicle of the user are co-located when the mobile device and the payment transaction vehicle are within a predefined distance of each other.

13. The computer program product of claim 10, wherein the mobile device of the user and the payment transaction vehicle of the user are co-located when it is determined that the mobile device and the payment transaction vehicle are within a predefined distance of each other upon a completion of a most recent transaction involving the payment transaction vehicle.

14. The computer program product of claim 10, wherein reconfiguring the one or more applications accessible to the mobile device comprises disabling access to one or more financial applications including a mobile banking application associated with a financial institution of the user.

15. A computer-implemented method for accessing a remotely located mobile device of a user, the method comprising:

monitoring one or more transactions involving a physical payment transaction vehicle of a user, wherein the payment transaction vehicle includes a positioning device;

determining, via the positioning device on the transaction vehicle, a geographic location of the payment transaction vehicle based at least partially on the one or more transactions;

determining, via a positioning device in a mobile device of the user, a geographic location of the mobile device, wherein the mobile device is associated with the payment transaction vehicle;

determining whether the payment transaction vehicle of the user and the mobile device of the user are co-located, based on a predefined proximity bridge, which is a distance range between the geographic location of the payment transaction vehicle and the geographic location of the mobile device and is predefined by the user or the system, wherein the mobile device and the payment transaction vehicle are not co-located if the geographic location of the mobile device and the geographic location of the payment transaction vehicle are not within the predefined proximity bridge;

disabling functionality of one or more applications or one or more features on the mobile device, based at least partially on determining that the mobile device and the payment transaction vehicle are not co-located, wherein disabling comprises reconfiguring the one or more applications or the one or more features on the mobile device; and providing a notification to the user indicating that functionality of the one or more applications or the one or more features accessible to the mobile device are disabled.

16. The computer-implemented method of claim 15, wherein the transaction vehicle comprises a bank card, a debit card, a credit card, a loyalty card, a resource access card, a virtual transaction card, or a combination any of the forementioned card types.

17. The computer-implemented method of claim 16, wherein the computer-implemented method further comprises providing a prompt, to the mobile device, requiring full authentication of the user prior to restoring the mobile device to an original state prior to the reconfiguration.

18. The method of claim 16, wherein the mobile device of the user and the payment transaction vehicle of the user are co-located when it is determined that the mobile device and the payment transaction vehicle are within a predefined distance of each other upon a completion of a most recent transaction involving the payment transaction vehicle.

19. The method of claim 16, wherein reconfiguring the one or more applications accessible to the mobile device comprises disabling access to one or more financial applications including a mobile banking application associated with a financial institution of the user.

* * * * *